United States Patent

Ogata et al.

[11] Patent Number: 5,804,128
[45] Date of Patent: Sep. 8, 1998

[54] CYLINDRICAL FILTER AND PROCESS FOR PRODUCING THE SAME

[75] Inventors: Satoshi Ogata; Yoshimi Tsujiyama, both of Shiga-ken, Japan

[73] Assignee: Chisso Corporation, Osaka-fu, Japan

[21] Appl. No.: 818,914

[22] Filed: Mar. 17, 1997

Related U.S. Application Data

[63] Continuation-in-part of Ser. No. 449,082, May 24, 1995, Pat. No. 5,670,044, which is a continuation-in-part of Ser. No. 057,116, May 4, 1993, Pat. No. 5,429,745.

[51] Int. Cl.$^6$ .................................................. B29C 49/00
[52] U.S. Cl. .................. 264/516; 264/541; 210/494.1; 210/497.01; 210/497.2; 428/373
[58] Field of Search ................................. 156/167, 446, 156/169, 173, 175, 296; 264/8, 12, 14, 177.14, 177.19, 2.1, 173.11, 541, 514, 516, 167; 428/299, 300, 303, 364, 365, 394, 395, 373; 210/494.1, 497.01, 497.2

[56] References Cited

U.S. PATENT DOCUMENTS

| | | | |
|---|---|---|---|
| 3,423,266 | 1/1969 | Davies et al. | 264/167 |
| 3,692,618 | 9/1972 | Dorschner et al. | 156/167 |
| 3,802,817 | 4/1974 | Matsuki et al. | 264/177.1 |
| 4,726,901 | 2/1988 | Pall et al. | 210/497.2 |
| 4,756,786 | 7/1988 | Malaney | 428/286 |
| 4,861,633 | 8/1989 | Abe | 428/36.3 |
| 5,382,400 | 1/1995 | Pike et al. | 264/168 |

*Primary Examiner*—W. L. Walker
*Attorney, Agent, or Firm*—Fay, Sharpe, Beall, Fagan, Minnich & McKee

[57] ABSTRACT

A cylindrical filter formed of stacked microfine, conjugate fibers consisting of a higher melting point component and a lower melting point component, the fiber diameter of the conjugate fibers being varied into a smaller one in the thickness direction of the filter and along with the passing direction of a fluid to be filtered, and the contact points of the conjugate fibers being melt-adhered by the lower melting point component is provided. This cylindrical filter is produced by a process of subjecting a higher melting point component and a lower melting point component each consisting of a fiber-forming thermoplastic polymer to conjugate melt-blow spinning so that the fiber diameter is varied during the spinning into a smaller one in the thickness direction of the filter and along with the passing direction of the fluid, winding up and stacking the fibers on a core to form a cylindrical shape on the core, heat-treating the resulting web at a temperature higher than the melting point of the lower melting point component and lower than the melting point of the higher melting point component, before and/or at the time of or after the winding-up, and drawing out the core.

7 Claims, No Drawings

5,804,128

CYLINDRICAL FILTER AND PROCESS FOR PRODUCING THE SAME

This is a continuation of application Ser. No. 08/449,082 filed on May 24, 1995; now U.S. Pat. No. 5,670,044, which is a continuation-in-part of application Ser. No. 08/057,116 filed on May 4, 1993, now U.S. Pat. No. 5,429,745.

BACKGROUND OF THE INVENTION

1. Field of the Invention

This invention relates to a cylindrical filter for precision filtration, prepared by winding up microfine fibers according to a melt-blow process in a cylindrical form, and a process for producing the same. 2. Description of the Related Art Various kinds of filters have been known, which are obtained by molding synthetic fibers into a cylindrical form. Japanese patent publication No. Sho 56-43139 discloses a process of winding up a carded web of conjugate fibers onto a core under heating. However, according to such a process, it is difficult to subject fine fibers of 1d/f or less to a carding process stably. Hence, a filter collecting fine particles of 10 μm or less could not have been obtained. Further, in the case of conventional synthetic fibers, an oiling agent is coated on the fibers in order to prevent charge and abrasion during the steps of spinning, stretching, carding, etc. This oiling agent causes such problems that it elutes from the fibers into the filtrated during filtration, resulting in bubbling and contaminating the filtrate such as foods, etc.

On the other hand, as cylindrical filters for precision filtration, filters using microfine fibers according to a melt-blow process have been broadly used as a filter for cleaning solutions for materials of electronic equipments or as an air filter for dedusting or as a prefilter for water, etc. used for pharmaceutical products, etc.

Japanese patent application laid-open No. Sho 60-216818 discloses a process of winding up fibers obtained according to a melt-blow process on a core after the fibers have been cooled down to a temperature at which they are not adhered to one another, and also discloses a process of gradually varying the fiber diameter in the thickness direction of the filter by controlling the spinning conditions. In the case of such a filter, the fibers are adhered to one another by entanglements of the fibers almost without bonding of the fibers with one another. Hence, the hardness of the filter is so low that a sufficient pressure-resistance cannot be obtained. In order to increase the hardness, a process of winding up the web while heating it may be considered, but the web is changed into a film due to melting of the fibers, so that clogging of the filtering layer occurs or the size of voids in the filter becomes non-uniform, resulting in a product having an inferior filtration life and accuracy.

Japanese patent application laid-open No. Hei 1-297113 discloses a process of winding up several kinds of non-woven fabrics according to a melt-blow process, each having different fiber diameters and bulk densities, successively each several times so that the inner layer of the filter may be dense and the outer layer thereof may be rough. However, according to the process, it is necessary to prepare several kinds of non-woven fabrics in advance, and not only the production steps are complicated and not efficient, but also the resulting filter is not adhered between the respective fibers of the non-woven fabric and between the respective layers thereof. Hence, solution leakage from the end part of the filter due to peeling-off of the layers during use of the filter are liable to occur and the pressure resistance is insufficient.

SUMMARY OF THE INVENTION

The object of the present invention is to provide a filter for precision filtration, which has a superior pressure resistance, does not contaminate the filtrate and has a long filtration life, and a simple process for producing the same.

The present inventors have made extensive research in order to solve the above-mentioned problems, and as a result, have found that the object can be achieved by winding up a microfine, conjugate fibers web obtained by stacking the fiber. According to a melt-blow process, while successively varying the fiber diameter, onto a core, heating the web so as to melt only the lower melting point component, to achieve the present invention.

The present invention has the following two aspects:

(1) A cylindrical filter formed of stacked microfine, conjugate fibers consisting of a higher melting point component and a lower melting point component, each obtained by a melt-blow spinning process, the fiber diameter of the conjugate fibers being varied into a smaller one in the thickness direction of the filter and along with the passing direction of a fluid to be filtered, and the contact points of the conjugate fibers being melt-adhered by the lower melting point component.

(2) A cylindrical filter according to item (1), wherein the fiber diameter of the conjugate fibers is varied from 0.5–3.0 micron on the inner surface of the filter, to 2.5–10 micron on the outer surface of the filter. Preferably the filter has a pressure resistance of at least about 5.0 Kg/cm$^2$ and a filtration life of at least about 20 minutes. In addition, the filter preferably has filtration accuracy of at least about 0.5 micron.

(3) A process for producing a cylindrical filter, which comprises subjecting a higher melting point component and a lower melting point component each consisting of a fiber-forming thermoplastic polymer to conjugate melt-blow spinning so that the fiber diameter is varied during the spinning into a smaller one in the thickness direction of the filter and along with the passing direction of a fluid to be filtered, winding up and stacking the fibers on a core to form a cylindrical shape on the core, heat-treating the resulting web at a temperature higher than the melting point of the lower melting point component and lower than the melting point of the higher melting point component, before and/or at the time of or after the winding-up, and drawing out the core.

(4) A process for producing a cylindrical filter according to item (3), wherein a pressurized air is blown at the melt-blow spinning so that the pressure of the air is decreased continuously or stepwisely during the spinning.

(5) A process for producing a cylindrical filter according to item (3), wherein an extrusion quantity of the polymer extruded from spinning nozzles is increased continuously or stepwisely during the spinning.

(6) A process for producing a cylindrical filter, which comprises subjecting a higher melting point component and a lower melting point component each consisting of a fiber-forming thermoplastic polymer to conjugate melt-blow spinning, stacking resulting fibers in the form of webs, winding up and stacking two or more of said webs on a core to form a cylindrical shape thereon, and drawing out the core; the fiber diameters of the webs being varied in the thickness direction of the filter and along with the passing direction of a fluid to be filtered, and the webs being heat-treated at a temperature higher than the melting point of the lower melting point component and lower than the melting point of the higher melting point component, before and/or at the time of or after said winding-up and stacking of the webs on the core.

(7) A process for producing a cylindrical filter according to item (6), wherein the webs before the winding up and stacking thereof on the core are formed into non-woven fabrics.

DETAILED DESCRIPTION OF PREFERRED EMBODIMENTS

The present invention will be described in detail.

The cylindrical filter referred to herein means a cylindrical filter having a cross-section of circular shape, elliptical shape, etc., as well as of multiple angles shape like triangular shape, tetrangular shape, etc. In addition, in the case where the shape of the core is polygonal (hexagonal, octagonal, etc. for example), as the fiber web is successively wound up and stacked on the core, the polygonal outer shape of the web is liable to become rounder and be close to a circular shape, but this has no influence upon the filter characteristics.

The conjugate fibers used for the filter of the present invention are obtained by subjecting two kinds of resins having different melting points of preferably 20° C. or more difference selected from fiber-forming thermoplastic resins such as polyolefins, polyesters, polyamides, etc. to conjugate spinning into side-by-side form or sheath-and-core type wherein the low melting point resin is arranged on the sheath side. In the case of the sheath-and-core type, not only a structure having a eccentric sheath component, but also a structure having a plurality of core components may be employed. Further, it is also possible to render the fiber cross-section as circular, elliptical or other various shaped cross-sections. An important factor for the structure of conjugate fibers consists in that the lower melting point component occupies at least a portion of the periphery of the fiber cross-section. The proportion in which the lower melting point component occupies the periphery of the fiber cross-section is not limited, and may vary in the direction of the fiber axis, for example. In short, such a conjugate structure may be formed so that the lower melting component causes melt-adhesion at the respective contact points of the fibers by heat-treatment as described below. Examples of the higher melting point component and the lower melting point component subjected to conjugate spinning are as follows:

combinations of polyethylene/polypropylene, polypropylene/polyester, nylon 6/nylon 66, etc. If the difference of the melting points of both the resins is less than 20° C., the temperature range of the heat treatment becomes narrow so that the process control becomes difficult. In addition, the conjugate ratio by weight of both the components are usually 80/20 to 20/80, preferably 65/35 to 35/65, more preferably 45/55 to 55/45.

As a process for spinning such conjugate fibers according to a melt-blow process, a process may be employed wherein, using a spinneret device as disclosed in Japanese patent application laid-open No. Sho 60-99057, two kinds of thermoplastic resins are melt and extruded from the respective extruders into a nozzle plate, followed by blowing off the melted resin extruded from spinning nozzles by a high speed hot air and stacking the resulting microfine conjugate fibers on a collecting conveyer.

As to the change in the fiber diameter in a melt-blow process, the diameter becomes larger with increase in the quantity of the resin extruded, while it becomes smaller with increase in the flow rate of the hot air.

Hence, when either one or the both of these conditions are successively or stepwisely varied, it is possible to obtain a web having the fiber diameter varied successively or stepwisely in the thickness direction of the web.

In the present invention, the diameter is successively or stepwisely decreased in the thickness direction of the filter and along with the passing direction of a fluid to be filtered. That is, when the passing direction of the fluid is from the outer surface of the cylindrical filter toward its inner surface thereof, the fiber diameter is made successively smaller from the outer surface of the filter toward its inner surface. To the contrary, when the passing direction is from the inner surface of the filter toward its outer surface, the fiber diameter is made successively smaller from the inner surface toward its outer surface. By employing such structure, the resulting filter has larger voids formed by thicker fibers on the inlet side of the solution, while it has smaller voids formed by finer fibers on the exit side of the solution (a density-gradient type filter is obtained). Thus, fine particles are classified and caught in the thickness direction of the filter, so that it is possible to obtain a filter having a long life of filtration.

As to concrete changes of the fiber diameter in the thickness direction of the filter, the fiber diameter is preferably varied from 2.5–10 micron (more preferably 3–8 micron) on the inlet surface of the filter, to 0.5–3.0 micron (more preferably 0.8–2.5 micron) on the outlet surface of the filter.

In the present invention, when a microfine conjugate fiber web obtained by stacking the fibers while varying the fiber diameter in the thickness direction is wound up and stack on a core to produce a cylindrical filter, heat-treatment is carried out before and/or at the time of or after the winding-up. The heat treatment referred to herein means heating at a temperature higher than the melting point of the lower melting point component and lower than the melting point of the higher melting point component. Concretely, the microfine conjugate fiber web having the fiber diameter successively varied, obtained by a melt-blow process, is once heat-treated into a non-woven fabric form and stored, followed by again heating it before or at the time of or after winding-up on a core, to obtain the cylindrical filter of the present invention. Alternatively, the web obtained after spinning is heated before and/or at the time of or after winding-up on a core, to obtain the cylindrical filter.

By such a heat-treatment, the contact points of the conjugate fibers with one another inside the web are fixed and also the layers of the wound webs are fixed therebetween by melt-adhesion of the lower melting component of the conjugate fibers. Hence, it is possible to obtain a filter having a high pressure-resistance.

As to the effectiveness of such a heat-treatment, it is more preferable to carry out the heat-treatment before and/or at the time of the winding-up on a core (at the winding-up point). In this case, since the fibers start to fix with each other from the inner layer of the web, the filter is sufficiently endurable to the outer pressure loaded at the time of winding up on a core, and also, the inner layer is liable to form denser voids between the fibers. Thus, the density gradient becomes notable along with the above-mentioned change in the fiber diameter, so that a synergistic effect of superior pressure-resistance and fine particles-classifying and collecting function can be obtained.

In general, filters are compressed by the pressure of a fluid passing therethrough and the voids between fibers cause clogging thereof to shorten the filtration life. This tendency becomes notable with increase in the fluid viscosity. Whereas, according to the present invention, conjugate fibers consisting of a higher melting point component and a lower melting point component are heat-treated, thereby melt-adhering only the lower melting component at the contact points of the fibers;

hence the resulting filter forms a three-dimensional structure by the adhesion at the contact points of the fibers and this structure prevents clogging of the voids brought about by the fluid pressure. Thus, in the present invention, porous substrate, reinforcing material, etc. are not required for the inner layer part, the filtration accuracy is stabilized due to the superior pressure resistance and the filtration life is prolonged. In the filter structure, if such a construction that only the lower melting point component of the conjugate fibers is adhered at the contact points of the fibers to form a three-dimensional structure, is deficient, even if the fiber diameter should have been varied in the thickness direction of the filter, the fusion and deformation of the fibers in the filter occur to cause clogging and lead to a short filtration life; hence the effectiveness of the present invention cannot be obtained.

As heating sources for the heat-treatment, hot air, pressurized steam, super-heated steam, far infrared rays heater, etc. are used, but among them, far infrared rays heater is particularly preferred, since a uniform heat-treatment is carried out without disturbing the web. As to an extent of the heat-treatment, it is adjusted so that fiber-fixing due to adhesion and a desired voids density may be obtained, that is, the temperature of a heating zone, the length of a heating zone or a passing speed i.e. a retention time in the heating zone, etc. are controlled. The web wound up on a core, and having been finished the heat-treatment is cooled by allowing it to stand at a room temperature, followed by drawing out the core and cutting to a suitable length to obtain a cylindrical filter.

Further, when the web is prepared according to a melt-blow process, fine particles such as those of active carbon, zeolite, ion exchange resin, etc. or functional fibers such as carbon fibers, sterilizing fibers, gas-adsorbing fibers, etc. may be mixed in the web or between the webs when they are wound up, within a range wherein the effectiveness of the present invention is not prevented. Thus, it is also possible to prepare a filter provided with other functions than collecting of fine particles.

The present invention will be concretely described by Examples and Comparative examples. The measurement methods employed in the respective examples will be described below.

Filtration Accuracy

A circulating type, filtration testing apparatus consisting of a water tank containing 30 l of water, a pump and a filtering device is employed. One sample filter is fixed to the housing of the filtering device. While water is circulated in a flow quantity of 30 l/min., 5 g of a cake (carborundum #4000) is added to the water tank. Filtered water (100 ml) collected one minute after addition of the cake is further filtered by a membrane filter capable of collecting particles of 0.6 micron or larger. The size of particles collected on the membrane filter is measured by an instrument for measuring the particle size distribution, and the size of the largest particle (the largest diameter (micron) of flown-out particles) is regarded as the filtration accuracy of the sample filter. Pressure resistance and filtration life:

One sample filter is fixed to a circulating type, filtration-testing apparatus and water is circulated in a flow quantity of 30 l per min. In a water tank is added powder of subsoil of volcanic ash soil (average particle diameter: 12.9 microns; powder having particle diameters within a range of 1.0 to 30 microns: 99% by weight or more) (20 g), followed by continuing circulating filtration. When water in the water tank has become transparent, the difference between the pressures before and after the filtration is measured. The operations of the addition of the powder and the measurement of the pressure difference are repeated till the filter is deformed (or the pressure difference reaches 10 Kg/cm$^2$). The time since the first powder addition till the filter deformation is regarded as a filtration life, and the pressure difference at that time is regarded as a pressure resistance.

Average Fiber Diameter

Ten thin pieces (each 4 cm×4 cm) are respectively cut from a web, a non-woven fabric or a filter, and the diameters of 100 ends of the respective fibers are measured with photographs of a magnification of 5,000 times taken by a scanning type electronic microscope. The average of the thus measured diameters is regarded as average fiber diameter.

EXAMPLE 1

Using a spinneret device for sheath-and-core type, conjugate melt-blow spinning having spinning nozzles (each, nozzle diameter: 0.3 mm and number of nozzles: 501) arranged in a row, polypropylene (melt flow rate (MFR: 230° C.): 280 g/10 min. and m.p.: 164° C.) as a core component (spinning temperature: 290° C.) and a linear, low density polyethylene (melt flow rate (MFR: 190° C.): 124 g/10 min. and m.p.: 122° C.) as a sheath component (spinning temperature: 260° C.) were extruded in a sheath-and-core conjugate ratio of 50/50 and in a total extrusion quantity of 120 g/min., blowing extrudates from the spinning nozzles onto a net conveyer by means of a pressurized air at 380° C., to obtain a microfine conjugate fiber web according to a melt-blow process. The pressurized air fed to the spinning nozzles was continuously and gradually reduced from an initial pressure of 3.2 Kg/cm$^2$G down to a final period pressure of 0.6 Kg/cm$^2$G.

This web was heated up to 145° C. by means of a far infrared rays heater while transferring it by a net conveyer, followed by winding up the web on a circular stainless pipe (outer diameter:. 30 mm) and allowing the resulting web to cool at a room temperature, as disclosed in Japanese patent publication No. Sho 56-43139. Thereafter, the stainless pipe was drawn out, followed by cutting the web to a length of 250 mm, to obtain a cylindrical filter (inner diameter: 30 mm, outer diameter: 60 mm and length: 25 mm).

The measurements of the samples taken from the web were as follows:

the average fiber diameters at the respective parts in the thickness direction of the filter: 0.8 micron ($\mu$m) on the inner surface, 1.8 micron ($\mu$m) at 5 mm apart from the inner surface, 2.7 micron ($\mu$m) at 10 mm apart from the inner surface, and 7.6 microns, on the outer surface.

In this filter, the respective fibers were adhered to one another at the contact points by melt-adhesion of the polyethylene as the lower melting point component to form a three-dimensional hard structure, and even when the filter was struck onto a desk, it was not deformed. This filter exhibited a filtration accuracy of 0.9 micron, a pressure resistance of 6.3 Kg/cm$^2$ and a filtration life of 30 min., and foaming of the filtrate at the initial period of the filtration was not observed.

EXAMPLE 2

Using the same spinneret device as in Example 1, polyethylene terephthalate (intrinsic viscosity: 0.60, m.p.: 253°

C., and spinning temperature: 285° C.) as a core component, and ethylene glycol terephthalate-isophthalate copolymer (intrinsic viscosity: 0.58, m.p.: 160° C., and spinning temperature: 270° C. as a sheath component, were extruded in a sheath-and-core conjugate ratio of 50/50 and in a total extrusion quantity of 120 g/min., blowing the polymers extruded from the spinning nozzles onto a net conveyer by a pressurized air at 350° C., to obtain a microfine conjugate fiber web according to a melt-blow process. The pressurized air fed to the spinning nozzles was continuously and gradually decreased from the initial pressure of 2.8 Kg/cm²G down to the final period pressure of 0.4 Kg/cm²G. This web was heated up to 170° C. by a far infrared rays heater, while transferring it by the net conveyer, followed by winding up it on a circular stainless pipe of an outer diameter of 30 mm and allowing it to cool at a room temperature. Thereafter, the stainless pipe was drawn out, followed by cutting it to a length of 250 mm, to obtain a cylindrical filter (inner diameter: 30 mm, outer diameter: 60 mm and length: 250 mm).

The average fiber diameters at the respective parts in the thickness direction of the filter were 1.8 micron on the inner surface, 3.9 microns at 5 mm apart from the inner surface, 6.8 microns at 10 mm apart from the inner surface and 9.2 microns on the outer surface. The fibers were adhered to one another at the contact points thereof by melt-adhesion of the lower melting point component to form a three-dimensional structure. The filter exhibited a filtration accuracy of 1.6 micron, a pressure resistance of 7.4 Kg/cm² and a filtration life of 36 min. Foaming of filtrate at the filtration initial period was not observed at all.

EXAMPLE 3

Using a spinneret device for sheath-and-core type conjugate, melt-blow spinning having spinning nozzles (nozzle diameter: 0.3 mm and 501 nozzles) arranged in a row, polypropylene (melt flow rate (MFR: 230° C.): 204 g/10 min., m.p.: 165° C. and spinning temperature: 280° C.) as a core component, and a linear, low density polyethylene (melt flow rate (MFR: 190° C.): 124 g/10 min., m.p.: 122° C. and a spinning temperature: 240° C.) as a sheath component were extruded in a core-and-sheath conjugate ratio of 50/50 and in a total extrusion quantity of initially 120 g/min. and from midway, 160 g/min. The polymers extruded from spinning nozzles were blown onto a net conveyer by a pressurized air of 1.9 Kg/cm²G, to obtain a microfine conjugate fiber web according to a melt-blow process.

This web was successively heated up to 145° C. by a far infrared rays heater while transferring it by the net conveyer, followed by winding up the web onto a circular stainless pipe (outer diameter: 30 mm) and allowing it to cool at a room temperature, as disclosed in Japanese patent publication No. Sho 56-43139. Thereafter the stainless pipe was drawn out, followed by cutting the web to a length of 250 mm, to obtain a cylindrical filter (inner diameter: 30 mm, outer diameter: 60 mm and length: 250 mm).

The average diameters at the respective parts of the filter were 1.8 micron from the inside surface up to 9 mm, and 2.7 microns at 9 mm or more apart from the inside surface. The fibers were adhered to one other at their contact points by adhesion of the low melting component to form a three-dimensional structure. This filter exhibited a filtration accuracy of 2.6 microns, a pressure resistance of 6.1 Kg /cm² and filtration life of 30 minutes. Foaming of the filtrate at the initial period of filtration was not observed.

EXAMPLE 4

Using a spinneret device for sheath-and-core type, conjugate, melt-blow spinning, having spinning nozzles. (nozzle diameter: 0.3 mm and 501 nozzles) arranged in a row, polypropylene (melt flow rate (MFR: 230° C.): 204 g/10 min., m.p.: 165° C. and spinning temperature: 280° C.) as a core component and a linear, low density polyethylene (melt flow rate (MFR: 190° C.): 124 g/10 min., m.p.: 122° C. and spinning temperature: 240° C.) as a sheath component, were extruded in a core-and-sheath conjugate ratio of 70/30 and in a total extrusion quantity of 120 g/min., blowing the polymers extruded from the spinning nozzles onto a net conveyer by a pressurized air of 1.9 Kg/cm²G and 360° C., to obtain a microfine conjugate fiber web (average fiber diameter: 2.4 microns) according to a melt-blown process. This web was wound up through a heating vessel heated to 140° C. by a far infrared rays heater, to obtain a non-woven fabric (non-woven fabric A) (average fiber diameter: 2.4 microns).

In the same manner as the above, except that the total extrusion quantity was changed to 160 g/min., a non-woven fabric (non-woven fabric B) (average fiber diameter: 8.8 mm) was obtained.

The non-woven fabric A was wound up on a stainless pipe (outer diameter: 30 mm) up to a thickness of 10 mm, while heating it at 145° C. by a far infrared rays heater, followed by winding up the non-woven fabric B up to a thickness of 5 mm while heating it in the same manner as the above, and allowing it to cool at a room temperature. Thereafter, the stainless pipe was drawn out to obtain a cylindrical filter (inner diameter: 30 mm, outer diameter: 60 mm and length: 250 mm).

This filter, too, had fibers adhered to one another at the contact points thereof by melt-adhesion of the lower melting component to afford a hard product of a three-dimensional structure (filtration accuracy: 2.4 microns, pressure resistance: 7.7 Kg/cm² and filtration life: 30 min.).. Foaming of the filtrate at the initial period of filtration was not observed.

EXAMPLE 5

Using a spinneret device for side by side type, conjugate, melt-blow spinning, having spinning nozzles (nozzle diameter: 0.3 mm and 501 nozzles) arranged in one row, polypropylene (melt flow rate (MFR: 230° C.): 280 g/10 min., m.p.: 164° C. and spinning temperature: 290° C.) as a first component and a linear, low density polyethylene (melt flow rate (MFR: 190° C.): 124 g/10 min., m.p.: 122° C. and spinning temperature: 260° C.) as a second component, were extruded in a conjugate ratio of 60/40 and in a total quantity extruded, of 120 g/min., blowing the polymers extruded from the spinning nozzles onto a net conveyer by a pressurized air at 380° C., to obtain a microfine, conjugate fiber web according to a melt-blow process. The pressurized air fed to the spinning nozzles was continuously and gradually decreased from the initial 3.2 Kg/cm²G down to the final 0.6 Kg/cm²G.

This web was heated to 145° C. by a far infrared rays heater, while transferring it by a net conveyer, followed by winding up it onto a circular stainless pipe (outer diameter: 30 mm) and allowing it to cool at room temperature, as disclosed in Japanese patent publication No. Sho 56-43139. Thereafter, the stainless pipe was drawn out, followed by cutting to a length of 250 mm, to obtain a cylindrical filter (inner diameter: 30 mm, outer diameter: 60 mm and length: 250 mm).

Measurements of the average fiber diameters at the respective parts in the thickness direction of samples taken from the web were as follows:

0.9 micron on the inner surface, 1.6 micron at 5 mm apart from the inner surface, 2.8 microns at 10 mm apart from the inner surface and 7.3 microns on the outer surface. In this filter, the fibers were adhered to one another at the contact points thereof by melt-adhesion of polyethylene as the lower melting point component to form a three-dimensional structure, and even when it was struck onto a desk, it was a hard product without deformation. This filter exhibited a filtration accuracy of 0.9 micron, a pressure resistance of 6.1 Kg/cm$^2$ and a filtration life of 29 min. Foaming of the filtrate at the initial period of filtration was not observed.

EXAMPLE 6

A microfine, conjugate fiber web according to a melt-blow process, obtained by spinning in the same conditions as in Example 5, was heated to 145° C. by a far infrared rays heater, while transferring it by a net conveyer, followed by winding up it on a stainless pipe having a periphery of a right hexagonal shape (width of each side: 15 mm), and allowing it to cool at a room temperature. Thereafter, the stainless pipe was drawn out, followed by cutting the web to a length of 250 mm, to obtain a cylindrical filter. This filter had an outer diameter of 60 mm at the largest part and that of 52 mm at the least part, that is, it had a shape almost close to a circular shape.

In this filter, the fibers were adhered to one another at the contact points thereof by adhesion of polyethylene to form a three-dimensional structure, and even when the filter was struck onto a desk, it was a hard product without deformation. This filter exhibited a filtration accuracy of 0.9 micron, a pressure resistance of 5.7 Kg/cm$^2$ and a filtration life of 30 min. Foaming of the filtrate at the initial period of filtration was not observed.

EXAMPLE 7

Using a spinneret device for sheath-and-core type, conjugate melt-blow spinning, having spinning nozzles (nozzle diameter: 0.3 mm and 501 nozzles) arranged in a row, polypropylene (melt flow rate (MFR: 230° C.): 180 g/10 min., m.p.: 165° C. and spinning temperature: 280° C.) as a core component and propylene-ethylene-butene-1 random copolymer (melt flow rate (MFR: 230° C.): 135 g/10 min., m.p.: 138° C. and spinning temperature: 300° C.) as a sheath component were extruded in a core-sheath conjugate ratio of 50/50 and initially in a total extrusion quantity of 120 g/min. and increasing from midway, in a total extrusion quantity of 160 g/min.

A core made of a porous pipe was rotated at a peripheral speed of 10 m/min. while the inside of the pipe was evacuated by suction, and the polymers extruded from the spinning nozzles were blown onto the core by a pressurized air (temperature: 360° C. and pressure: 1.9 Kg/cm$^2$), whereby a microfine conjugate fiber web according to a melt-blow process was stacked around the core and wound up thereon.

After completion of the winding up, while the suction and rotation were continued, the web together with the core were heated in a heating vessel having the atmospheric temperature of 140° C. by a far infrared rays heater, followed by allowing the web to cool at a room temperature. Thereafter, the core was drawn out, followed by cutting the web to a length of 250 mm, to obtain a cylindrical filter (inner diameter: 30 mm, outer diameter: 60 mm and length: 250 mm).

Measurements of samples taken from the web were as follows:

the average fiber diameters at the respective parts in the thickness direction of the filter were 1.6 micron between the inside surface and 9 mm apart therefrom, and 2.8 microns at 9 mm or more apart from the inside surface. The fibers were adhered to one another at their contact points by melt-adhesion of the lower melting point component to form a three-dimensional structure. Even when the filter was struck onto a desk, it was a hard product having no deformation. This filter exhibited a filtration accuracy of 2.5 microns, a pressure resistance of 6.8 Kg/cm$^2$ and a filtration life of 27 min. Foaming of the filtrate at the initial period of filtration was not observed.

EXAMPLE 8

Employing a side-by-side type spinneret for melt-blow spinning wherein spinning nozzles (hole diameter: 0.25 mm and number of holes: 501) were arranged in rows, a polypropylene (melt flow rate at 230° C.: 280 (g/10 min) and m.p.: 164° C.) as a higher melting point component (spinning temperature: 300° C.) and a propylene-ethylene-butene-1 random copolymer (melt flow rate at 230° C.: 90 (g/10 min) and m.p.: 133° C.) as a lower melting point component (spinning temperature: 320° C.), were fed into the spinneret in a conjugate ratio of 60/40 by weight and in a total extrusion quantity of 110 g/min, followed by blowing the polymers extruded from the spinning nozzles onto a net conveyer using a heated air of 385° C., to obtain a microfine conjugate fiber web according to melt-blow process.

The web was heated to 147° C. by means of a far-infrared radiation heater, while transferring it by means of a net conveyer, as disclosed in Japanese patent publication No. Sho 56-43139, followed by winding it up onto a circular stainless pipe of 30 mm in the outer diameter, allowing it to cool at room temperature (22° C.) , drawing it out of the stainless pipe, and cutting to a length of 250 mm, to obtain a cylindrical filter having an inner diameter of 30 mm, an outer diameter of 60 mm and a length of 250 mm. In addition, during the winding-up, the pressure of air fed to the spinning nozzles was continuously and gradually reduced from an initial 3.0 Kg/cm$^2$·G down to a final 0.5 Kg/cm$^2$·G.

According to the measurement of the sample taken from the web, the average fiber diameters at the respective portions in the thickness direction of the filter were 0.6 micron on the inner side surface, 1.8 micron at 7.5 mm from the inner side and 6.2 microns on the outer side surface. As to this filter, the fibers were adhered to each other at their contact points by melt-adhesion of the lower melting point component, to form a three-dimensional structure, and even when the filter was struck onto a desk, it was hard enough not to cause deformation. This filter had a filtration accuracy of 0.5 micron, a pressure resistance of 6.3 Kg/cm$^2$ and filtration life of 23 minutes, and bubbling of the filtrate at the initial period of the filtration was not observed at all.

EXAMPLE 9

Employing a side-by-side type spinneret for melt blow wherein spinning nozzles (hole diameter: 0.25 mm and number of holes: 501) were arranged in rows, a polypropylene (melt flow rate at 230° C.: 310 (g/10 min) and m.p.: 162° C.) as a higher melting point component (spinning temperature: 320° C.) and a propylene-ethylene-butene-1 random copolymer (melt flow rate at 230° C.: 102 and m.p.: 131° C.) as a lower melting point component (spinning temperature: 320° C.), were fed into the spinneret, in a conjugate ratio of 50/50 by weight and in a total extrusion quantity of 110 g/min, followed by blowing the polymers extruded from the spinning nozzles onto a net conveyer using a heated air of 385° C., to obtain a microfine conjugate fiber web according to melt-blow process.

The web was heated to 147° C. by means of a far-infrared radiation heater while transferring it on a net conveyer, as in Example 8, followed by winding it up onto a circular stainless pipe of 30 mm in an outer diameter, allowing it to cool at room temperature, drawing out the stainless pipe and cutting it to a length of 250 mm, to obtain a cylindrical filter having an inner diameter of 30 mm, an outer diameter of 60 mm and a length of 250 mm. In addition, during the winding-up, the pressure of air fed to the spinning nozzles was continuously and gradually reduced from an initial 3.6 $Kg/cm^2 \cdot G$ down to a final 0.6 $Kg/cm^2 \cdot G$.

According to measurement of the sample taken from the web, the average fiber diameters at the respective portions in the thickness direction of the filter were 0.3 micron on the inner side surface, 1.3 micron at 7.5 mm from the inner side and 5.8 micron on the outer side surface. As to this filter, fibers were adhered to each other at their contact points by melt-adhesion of the lower melting point component, to form a three-dimensional structure, and even when the filter was struck on a desk, it was hard enough not to cause deformation. This filter had a filtration accuracy of 0.3 micron, a pressure resistance of 5.3 $Kg/cm^2$ and a filtration life of 20 minutes, and bubbling of the filtrate at the initial period of the filtration was not observed at all.

Comparative Example 1

Using a spinneret device for melt-blow spinning, having spinning nozzles (nozzle diameter: 0.3 mm and 501 nozzles) arranged in a row, polypropylene (melt flow rate (MFR: 230° C.): 180 g/10 min. and m.p.: 164° C.) was extruded at a spinning temperature of 280° C. and in an extrusion quantity of 120 g/min., blowing the polymer extruded from the nozzles onto a net conveyer by a pressurized air of 380° C., to obtain a microfine fiber web according to a melt-blow process. The pressurized air fed to the spinneret was continuously and gradually decreased from the initial 3.2 $Kg/cm^2G$ down to the final 0.6 $Kg/cm^2G$.

In the same manner as in Example 1, this web was heated at 190° C. by a far infrared rays heater, while transferring it by a net conveyer, followed by winding up it on a circular stainless pipe (outer diameter: 30 mm), allowing it to cool at a room temperature, drawing out the stainless pipe and cutting the web to a length of 250 mm, to obtain a cylindrical filter (inner diameter: 30 mm, outer diameter: 60 mm and length: 250 mm).

The average fiber diameters at the respective parts of the web in the thickness direction were 3.4 microns on the inner surface, 8.2 microns at 5 mm apart from the inner surface, 15 microns at 10 mm apart from the inner surface and 22 microns on the outer surface, but in the filter itself, cloggings due to fusion and deformation of the fibers were observed, so that the filter was very hard. In this filter, foaming of the filtrate at the initial period of the filtration was not observed. The filter exhibited a filtration accuracy of 3.2 microns and a pressure resistance of 6.5 $Kg/cm^2$, but the filtration life was as very short as 5 min.

Comparative Example 2

A cylindrical filter was prepared under the same conditions as in Example 1 except that the pressure of the pressurized air was fixed to 3.2 $Kg/cm^2G$. The filter was composed of conjugate fibers having an average fiber diameter of 0.9 micron, uniformly in the thickness direction of the filter, and had an inner diameter of 30 mm, an outer diameter of 60 mm and a length of 250 mm. This filter exhibited a filtration accuracy of 0.9 micron and a pressure resistance of 6.5 $Kg/cm^2$, but its filtration life was as short as 10 min.

Comparative Example 3

A cylindrical filter was prepared in the same conditions as in Example 1 except that the pressure of the pressurized air was fixed to 0.6 $Kg/cm^2G$. The filter was composed of conjugate fibers having an average fiber diameter of 7.3 micron, uniformly in the thickness direction of the filter, and had an inner diameter of 30 mm, an outer diameter of 60 mm and a length of 250 mm.

This filter exhibited a pressure resistance of 6.05 $Kg/cm^2$ and a filtration life of 50 min., but its filtration accuracy was as inferior as 7.0 microns.

Reference Example 1

A polypropylene web of an average fiber diameter of 1.3 micron, obtained according to a melt-blow spinning process, was wound up on a reinforced, porous plastic cylinder to obtain a commercially available filter (inner diameter: 30 mm, outer diameter: 60 mm and length: 250 mm), and its properties were tested.

As to this filter, foaming of the filtrate at the initial period was not observed, but its average fiber diameter was small and nevertheless its filtration accuracy was as inferior as 9.0 microns, its pressure resistance was as low as 1.8 $Kg/cm^2$ and its filtration life was as short as 8 min. It is considered that the reason will be in that since the fibers are fixed to one another merely by a frictional force, the pores inside the filter are opened by the water pressure to lower the filtration accuracy, or the filter itself is deformed.

Effectiveness of the Present Invention

According to the filter of the present invention, since microfine, conjugate fibers by a melt-blow process and a large gradient of the size of the voids between the inside and the outside of the filter by varying the fiber diameter in the thickness direction of the filter, the filtration accuracy is superior and the filtration life is prolonged. Further, since the fibers are adhered to one another at the contact points thereof by adhesion of the lower melting point component to form a three-dimensional structure, the filter is hard by itself, no reinforcing material is required and even in the case of a high pressure filtration, the pores of the filter are not opened, so that the pressure resistance is superior and a precision filtration can be stably carried out. Further, since an oiling agent for fiber processing is not used, the filtrate is not contaminated by the oiling agent, so that the filter is safely usable in the food-processing field or in the field of electronic instruments.

What we claim is:

1. A process for producing a cylindrical filter, which comprises subjecting a higher melting point component and a lower melting point component, each comprised of a fiber-forming thermoplastic polymer, to conjugate melt-blow spinning so that microfine conjugate fibers are formed and the diameter of the fibers becomes smaller during spinning in the thickness direction of the filter and along the direction of passage of a fluid to be filtered, said process consisting essentially of winding up and stacking the fibers on a core to form a cylindrical shape on the core, heat-treating the resulting web at a temperature higher than the melting point of the lower melting point component and lower than the melting point of the higher melting point component before and/or at the time of or after the winding up, and drawing out the core, said melt-blow spinning is carried out by blowing a pressurized air so that it is decreased continuously or stepwisely during said spinning.

2. A process for producing a cylindrical filter according to claim 1, wherein an extrusion quantity of the polymer extruded during said melt-blow spinning is increased continuously or stepwisely during said spinning.

3. A process for producing a cylindrical filter according to claim 1, wherein said web before said winding up and stacking thereof on the core is formed into nonwoven fabrics.

4. The process of claim 1 wherein said filter has larger voids on an inlet side than on an exit side.

5. A process for producing a cylindrical filter according to claim 1, wherein the diameter of the microfine conjugate fibers is 0.5 to 10 micron.

6. A process for producing a cylindrical filter, which comprises subjecting a higher melting point component and a lower melting point component, each comprised of a fiber-forming thermoplastic polymer, to conjugate melt-blow spinning so that microfine conjugate fibers are formed and the diameter of the fibers becomes smaller during spinning in the thickness direction of the filter and along the direction of passage of a fluid to be filtered, winding up and stacking the fibers on a core to form a cylindrical shape on the core, heat-treating the resulting web at a temperature higher than the melting point of the lower melting point component and lower than the melting point of the higher melting point component before and/or at the time of or after the winding up, and drawing out the core, wherein an extrusion quantity of the polymer extruded during said melt-blow spinning is increased continuously or stepwisely during said spinning.

7. A process for producing a cylindrical filter according to claim 6, wherein the diameter of the microfine conjugate fibers is 0.5 to 10 micron.

* * * * *